(12) United States Patent
Dempski et al.

(10) Patent No.: US 7,409,639 B2
(45) Date of Patent: Aug. 5, 2008

(54) INTELLIGENT COLLABORATIVE MEDIA

(75) Inventors: Kelly L. Dempski, Evanston, IL (US); Christopher K. Chung, Chicago, IL (US)

(73) Assignee: Accenture Global Services GmbH, Schaffhausen (CH)

( * ) Notice: Subject to any disclaimer, the term of this patent is extended or adjusted under 35 U.S.C. 154(b) by 867 days.

(21) Appl. No.: 10/464,917

(22) Filed: Jun. 19, 2003

(65) Prior Publication Data

US 2005/0010637 A1    Jan. 13, 2005

(51) Int. Cl.
*G06F 13/00* (2006.01)
*G06F 15/00* (2006.01)

(52) U.S. Cl. .................... 715/705; 715/711

(58) Field of Classification Search ......... 715/705–711, 715/723–728, 750–751, 32, 122; 725/32, 725/122

See application file for complete search history.

(56) References Cited

U.S. PATENT DOCUMENTS

| | | | |
|---|---|---|---|
| 5,347,506 A | * | 9/1994 | Matsudo et al. .......... 369/53.29 |
| 5,880,731 A | * | 3/1999 | Liles et al. ................ 715/758 |
| 6,119,147 A | | 9/2000 | Toomey et al. |
| 6,430,602 B1 | | 8/2002 | Kay et al. |
| 2001/0037367 A1 | | 11/2001 | Iyer |
| 2003/0014423 A1 | | 1/2003 | Chuah et al. |
| 2003/0101450 A1 | * | 5/2003 | Davidsson et al. ............ 725/32 |

FOREIGN PATENT DOCUMENTS

| | | |
|---|---|---|
| EP | 1 168 197 A2 | 1/2002 |
| GB | 2 351 216 A | 12/2000 |
| WO | WO 03/003342 A1 | 1/2003 |
| WO | WO 03/026299 A1 | 3/2003 |

OTHER PUBLICATIONS

Diederiks, Elmo M.A., "Buddies in a Box Animated Characters in Consumer Electronics" IUI'03, Jan. 12-15, 2003, Miami, Florida.

* cited by examiner

*Primary Examiner*—Cao Nguyen
(74) *Attorney, Agent, or Firm*—Brinks, Hofer, Gilson & Lione

(57) ABSTRACT

The present invention includes a system and method for enhancing multimedia information shared on electronic systems. The electronic systems are capable of receiving multimedia information and presenting multimedia information. In combination with the multimedia information, a representation is presented which is based on the shared multimedia information. The representation may be an avatar for display. Further, the representation may be based on control of the multimedia information, content of the multimedia information or reaction to the multimedia information.

41 Claims, 7 Drawing Sheets

INTELLIGENT COLLABORATIVE MEDIA

BACKGROUND

Electronic devices which exchange information are, on a basic level, an opportunity for social interaction. People in different locales may connect with one another through the use of electronic devices. As one example, it is common for people at different locations to watch a television program or a sporting event while talking on the telephone. The television program acts as the backdrop for the people to interact. As another example, people interact and share information with one another in online social environments, such as instant messaging, short message service (SMS), chat rooms, and bulletin boards.

Technologies have attempted to enhance the social interaction aspect. For example, some digital video recorders allow users to view a common program in different locations. The program may be a movie or a television program which is controlled by the users. Similarly, technologies allow remote users to share a voice connection between the remote users. However, these additional features have their drawbacks. The shared control of the media makes viewing difficult due to contextless control changes in the media programming. With regard to the shared voice connection, it is disconcerting for a person to hear a multitude of disembodied voices from several remote players. As another example, some set-top boxes have collaboration features such as voting or video conferencing. However, video conferencing is not an ideal solution when sharing media because a video conferencing image would take up valuable screen real estate and detract from the shared media.

Online social environments have also attempted to enhance the social interaction aspect using collaborative applications such as text talk, sharing files and video conferencing. However, these applications are image and expression poor, limiting participants in how they can personalize and express their online persona.

What is needed is a richer information experience that provides better social interaction when using electronic devices.

SUMMARY

The present invention is intended to enhance the social experience when sharing information using electronic devices. The sharing of the information may be the common receipt by the electronic devices of the information from a third party, such as the receipt of a broadcast by the electronic devices. Alternatively, the sharing of the information may be the sending of the information from one electronic device to another.

In a first embodiment of the present invention, a method for enhancing shared multimedia information in a communication session between a first participant on a first electronic system and a second participant on a second electronic system is provided. The method comprises presenting multimedia information in the communication session identically on the first electronic system and on the second electronic system, determining an avatar of the first participant based on the multimedia information presented in the communication session, the avatar being separate from the multimedia information, and presenting the avatar on the second electronic system in the communication session.

In a second embodiment of the present invention, a method for enhancing shared multimedia information in a communication session between a first participant on a first electronic system and a second participant on a second electronic system is provided. The method comprises presenting multimedia information in the communication session identically on the first electronic system and on the second electronic system, determining a representation of the first participant based on the multimedia information presented in the communication session, the representation being separate from the multimedia information, and presenting the representation on the second electronic system in the communication session, the representation conveying spatial information.

In a third embodiment of the present invention, a method for enhancing a communication session between a first participant on a first television receiver and a second participant on a second television receiver is provided. The method comprising determining activity of the first participant, presenting multimedia information on the second television receiver, determining a representation of the first participant based on the activity of the first participant, the representation being separate from the multimedia information presented on the second television receiver, and presenting the representation on the second television receiver in the communication session.

In a fourth embodiment of the present invention, a system for enhancing a video presentation between a first participant and a second participant is provided. The system comprises a first electronic system capable of presenting the video presentation, the first electronic system having an input device and a second electronic system in communication with the first electronic system for receiving data based on input from the input device. The second electronic device comprises a receiver for receiving the video presentation, a memory for storing at least a portion of the data based on the input and avatar information of the first participant, a processor in communication with the memory and the receiver for selecting an avatar to be presented based on the at least a portion of the data and the avatar information, and a video display monitor in communication with the processor for presenting the avatar selected by the processor and for presenting the video presentation, the presenting of the video presentation being identical to the video presentation presented on the first electronic system.

In a fifth embodiment of the present invention, a system for enhancing a video presentation between a first participant and a second participant is provided. The system comprises a first electronic system capable of presenting the video presentation and a second electronic system in communication with the first electronic system. The second electronic system comprises a receiver for receiving the video presentation, a memory for storing at least a portion of the video presentation and avatar information of the first participant, a processor in communication with the memory and the receiver for selecting an avatar to be presented based on content of the video presentation and the avatar information, and a video display monitor in communication with the processor for presenting the avatar selected by the processor and for presenting the video presentation, the presenting of the video presentation being identical to the video presentation presented on the first electronic system.

DETAILED DESCRIPTION OF THE INVENTION

Electronic devices are instruments for social interaction. People share information via the electronic devices in an attempt to connect on a social level. Oftentimes, electronic devices are merely used to regurgitate information. Information entered into one electronic device is transmitted to another device for presentation in its originally entered form. This mere repeating of the information limits the ability for people to connect on a social level since it does not mirror ordinary social interaction.

Figure 1:
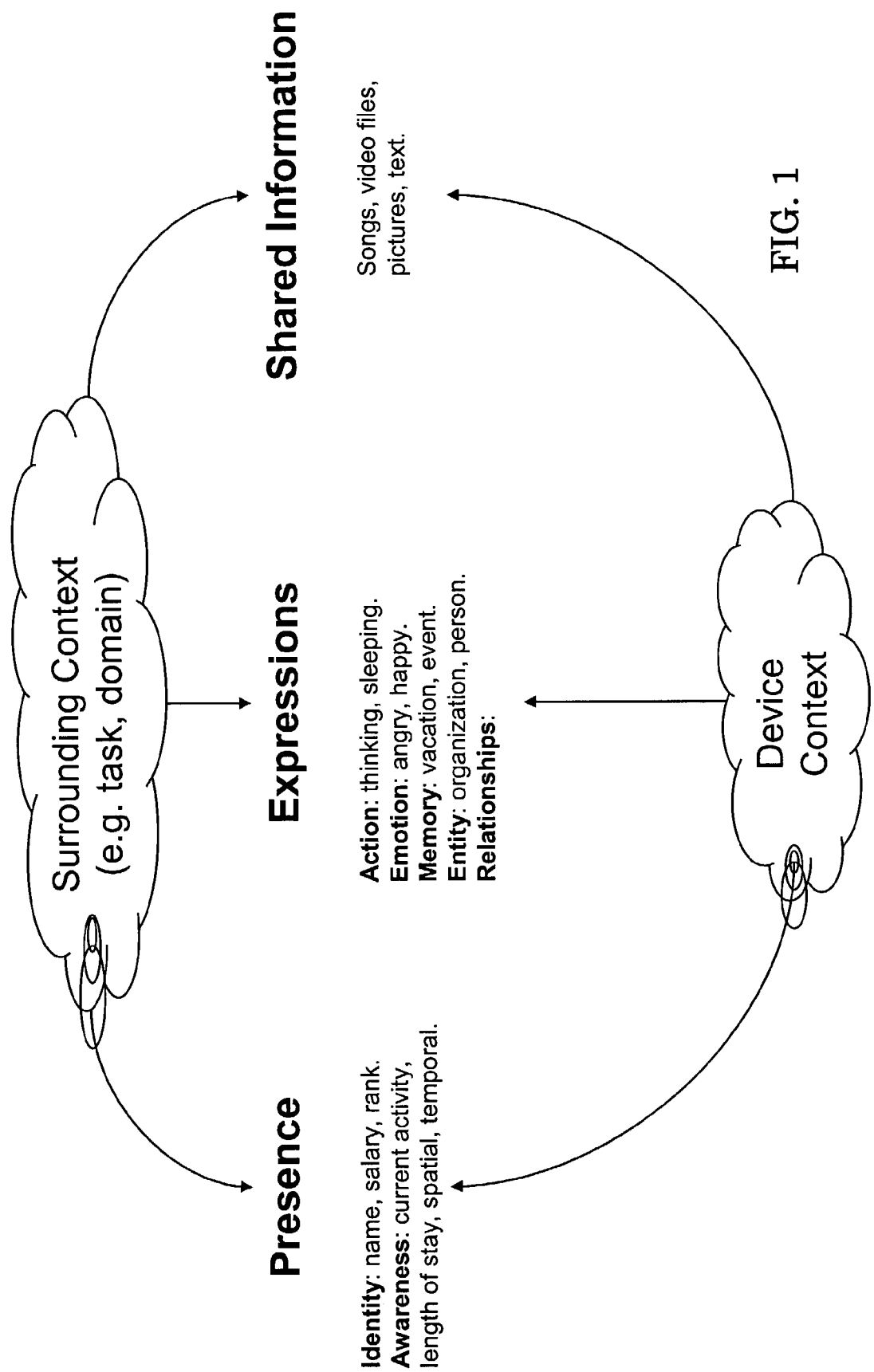
FIG. 1 is a flow diagram of exemplary aspects of social interaction.

Turning to the drawings, wherein like reference numerals refer to like elements, FIG. 1 shows a flow diagram of exemplary aspects of social interaction. One aspect of social interaction is the shared information. Shared information may include any item that is presented among electronic devices. Shared information may include songs, video files, pictures, and/or text which are presented on the electronic device. For example, when two electronic devices, such as television receivers, receive a common broadcast, the shared information that is presented on the television receivers may be the video broadcast feed. Another aspect of social interaction is participant information. Participant information generally relates to factual information about a participant, such as presence, or ideas that a participant wants to convey, such as expressions. Presence may include any short-term or long-term attributes about a participant to a social interaction. Specifically, presence may include identity, such as name, salary, rank, etc. and awareness, such as current activity, length of stay, spatial information (absolute location or location relative to someone else), and temporal information (how long performing certain activity). Expression may include any concepts the participant wishes to convey such as an action (e.g., thinking, sleeping, eating, etc.), emotion (e.g., angry, happy, sad, etc.), memory (e.g., vacation, event, etc.), entity (e.g., organization, person, etc.) and relationships (e.g., comparative relationships). Another aspect is the surrounding context of the shared communication. The surrounding context may include the physical surroundings of one or both of the participants to a shared information session, including current location (e.g., home, business, vacation), temperature, light, noise, etc. The surrounding context may also include an event or a time, such as when two people are watching the same live-breaking news event. Finally, another aspect is the device context. The device context may include the specific parameters of the electronic device to a communication. As discussed above, examples of electronic devices include computers, televisions, telephones (such as cellular phones), personal digital assistants (PDAs), and camcorders. Each of these devices has specific requirements and limitations. For example, a telephone has limitations regarding displaying video or text information. As another example, some set-top boxes may have more or less features than other set-top boxes. As still another example, representations might be perceived differently depending on the size of the monitor.

Figure 2:
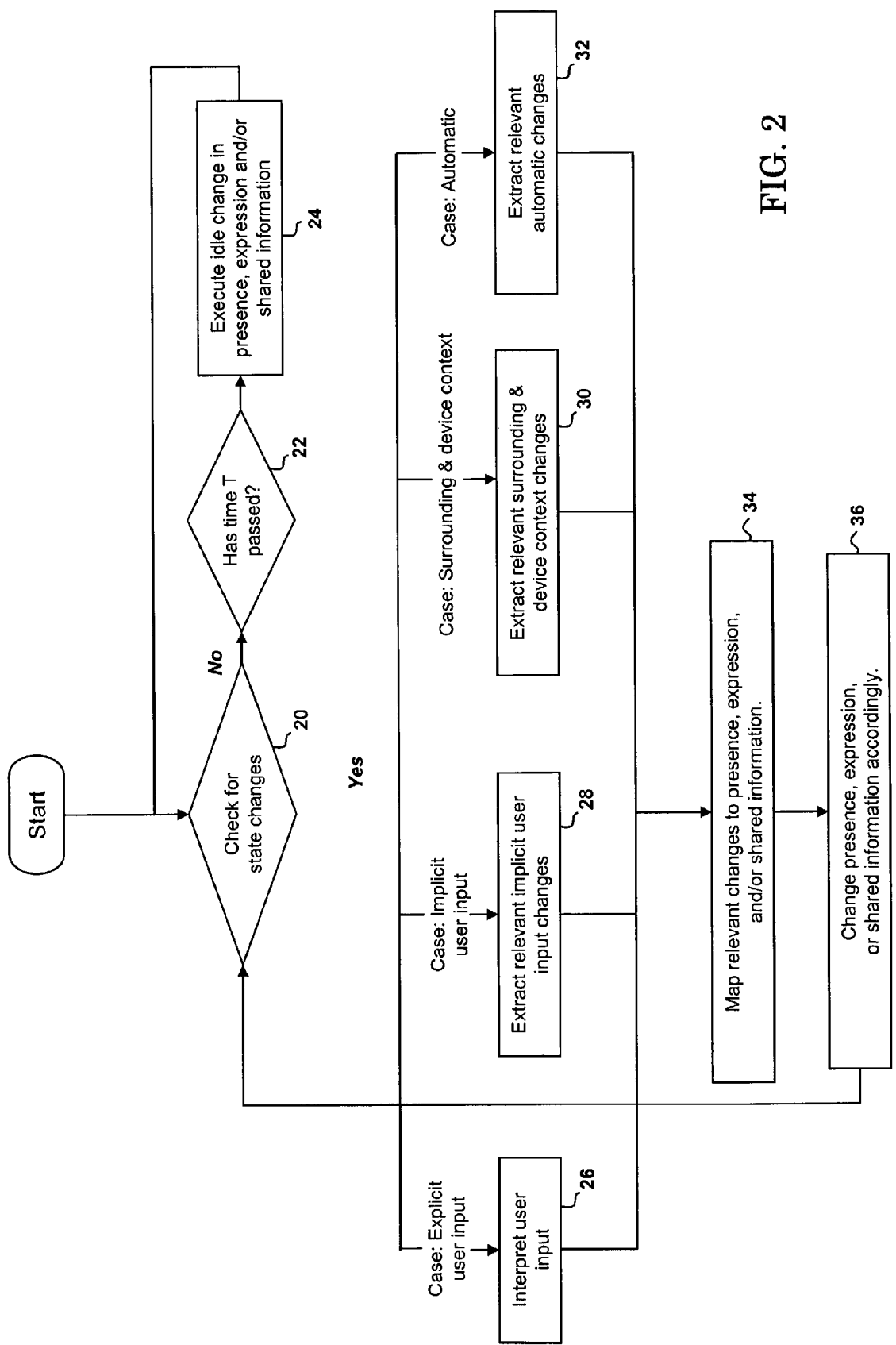
FIG. 2 is a flow chart of a system which uses the attributes disclosed in FIG. 1 to modify participant information and/or shared information.

Referring to FIG. 2, there is shown a flow chart of a system which uses the attributes disclosed in FIG. 1 to modify participant information and/or shared information. At block 10, state changes are checked. State changes designate a change in status of the system including: participant input (either explicit, as shown at block 13, or implicit, as shown at block 14); surrounding or device context changes; and automatic changes. As shown at block 13, the explicit participant input is interpreted. With explicit participant input, the participant directly specifies how identity, expression, and/or shared information should change. For example, the participant may update his or her emotion information by explicitly typing in his or her current emotion. As shown in block 14, the relevant implicit participant input changes are extracted. Implicit participant input may include any indirect input by the participant such as: (1) automatic reaction information of the participant, such as by determining a participant's reaction to the shared information by sensors, as discussed subsequently; and (2) input from other controllers/devices the participant may be using, such as a remote controller. As shown at block 15, relevant surrounding and device context changes are extracted. Surrounding context changes determine whether there is any change in the surroundings of the participant. As discussed above, the surroundings context may include information regarding current location, event, temperature, light, noise, etc. Device context changes determine whether there is any change in the device used (such as switching from a computer to a television) or in the capabilities of the device (such as a change in cellular phone service). As shown at block 16, the relevant automatic changes are extracted. Automatic changes may include changes in the shared information; changes in identity, expression, or objects made by other systems; idle changes made by the system on a previous iteration (as shown at block 12); and changes in identity, expression, or object made by the system on a previous iteration (as shown at block 18). The relevant changes are then mapped to a presence, expression and/or shared information, as shown at block 17. The changes are then implemented, as shown at block 18. For example, changes in one aspect may affect another aspect in the system. These changes may be made continuously. For example, the changes may be made essentially on a frame by frame basis.

The electronic devices communicating in a shared information session may be connected in a variety of ways including a wired connection (such as a telephone line), a wireless connection, or a combination of wired and wireless connection. Further, the topography for the connection of the various electronic devices may vary. For example, the electronic devices may be interconnected via a communications network, which can be a LAN, WAN, intranet or the Internet.

Figure 3:
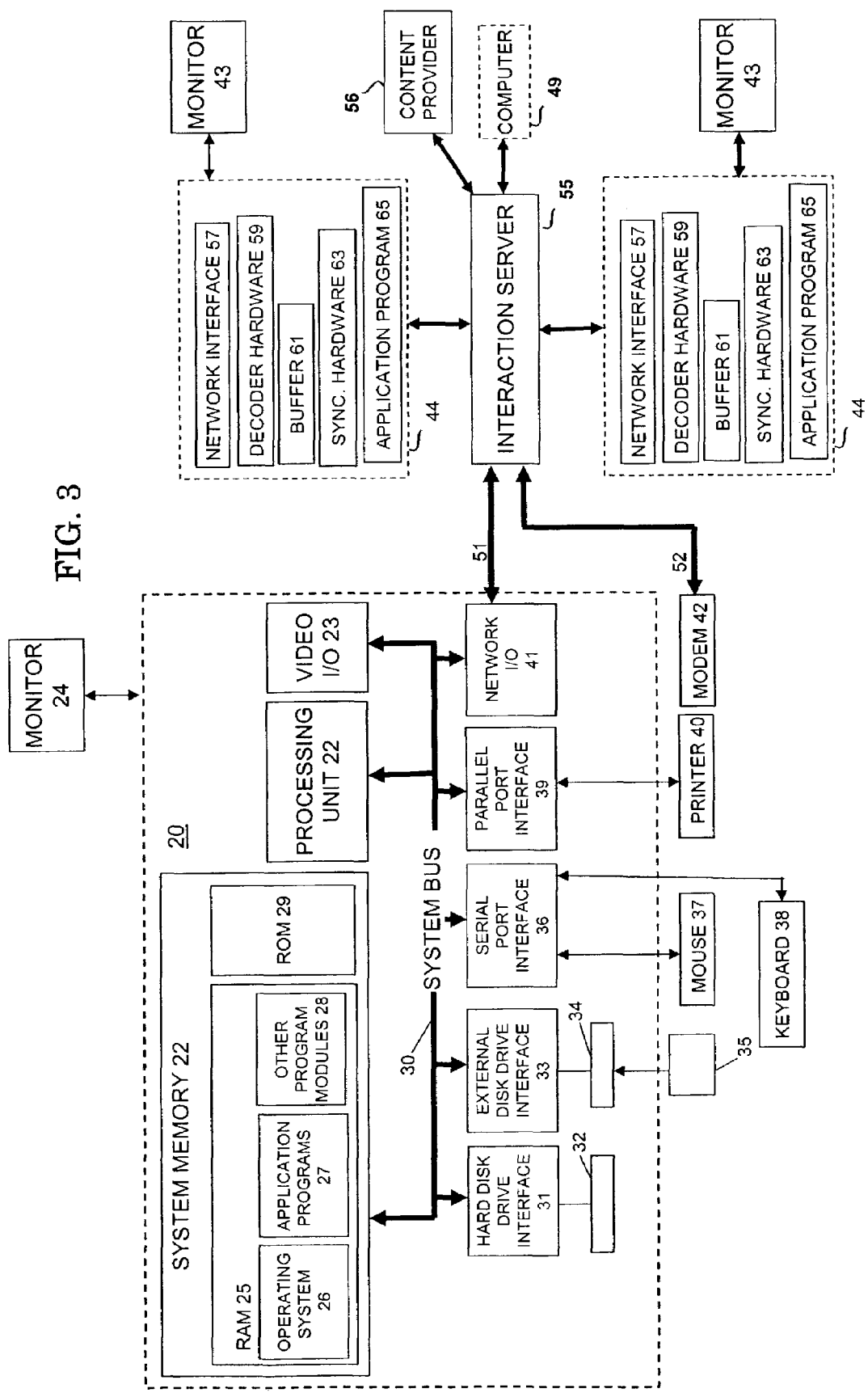
FIG. 3 is a schematic of one embodiment of a system for sharing information among electronic devices.

One example topology is shown in FIG. 3, wherein the electronic systems communicate via an interaction server 55. In a network environment in which the communications network is the Internet, for example, the interaction server 55 can be a Web server with which the electronic systems communicate via any of a number of known protocols, such as HTTP. The content provider 56 may send shared information, such as media, to all participants' electronic systems via the interaction server 55. Alternatively, the shared information may be received by the electronic systems separate from the content provider 56, such as via a television broadcast feed. The content provider 56 may make decisions based on centrally stored preferences, such as presence and expression information, and media data and then pass final instructions to other participants' electronic systems. The media data is related to the shared information, such as mark-up data or extended data for the shared information. The final instructions may include instructions with regard to representations, such as an avatar, displayed at the participants' electronic devices. Participant invoked actions, such as explicit or implicit participant input as discussed with respect to FIG. 2, may be sent to the interaction server 55 and "reflected" or sent to other participants' electronic systems. For example, implicit participant input such as audio input may be sent to the interaction server 55 and then distributed to the other participants' electronic systems. If appropriate, the interaction server 55 mediates inter-client communication. As shown in FIG. 3, the content provider 56 and interaction server 55 are separate entities. Alternatively, the content provider 56 and interaction server 55 may be an integral unit.

Any type of electronic systems capable of sharing information may be used. Some examples include, without limitation, computers, set-top boxes, televisions, telephones (such as cellular telephones), personal digital assistants (PDAs), and camcorders. FIG. 3 includes, as one electronic system, a general purpose computing device in the form of a conventional personal computer 20, including a processing unit 22, a system memory 21, and a system bus 30 that couples various system components including the system memory to the processing unit 22. The system bus 30 may be any of several types of bus structures including a memory bus or memory controller, a peripheral bus, and a local bus using any of a variety of bus architectures. The system memory includes read only memory (ROM) 29 and random access memory (RAM) 21. A basic input/output system (BIOS) containing the basic routines that helps to transfer information between elements within the personal computer 20, such as during start-up, is stored in ROM 29. The personal computer 20 further includes a hard disk drive 32 for reading from and writing to a hard disk, not shown, and an external disk drive 34 for reading from or writing to a removable disk 35. The removable disk may be a magnetic disk for a magnetic disk driver or an optical disk such as a CD ROM for an optical disk drive 30. The hard disk drive 32 and external disk drive 34 are connected to the system bus 30 by a hard disk drive interface 31 and an external disk drive interface 33, respectively. The drives and their associated computer-readable media provide nonvolatile storage of computer readable instructions, data structures, program modules and other data for the personal computer 20. For example, shared multimedia (such as a shared video presentation) may be entered into personal computer 20 using an external disk drive 34 and external disk drive interface 33. Although the exemplary environment described herein employs a hard disk and an external disk 29, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, external disk 35, ROM 29 or RAM 21, including an operating system 26, one or more application programs 27, other program modules 28, and program data. One such application program may include the functionality as detailed in FIG. 6. For example, the application program may search for information in the media signal (such as extended information), compare it with user preferences, and present a representation, as discussed below. Moreover, the application program may receive data, such as explicit or implicit user input, and present a representation based on the input.

A user may enter commands and information, as discussed below, into the personal computer 20 through input devices such as a keyboard 38 and pointing device, such as mouse 37. Other input devices (not shown) may include a microphone (or other sensors), joystick, game pad, satellite dish, scanner, or the like. These and other input devices are often connected to the processing unit 29 through a serial port interface 36 that is coupled to the system bus, but may be collected by other interfaces, such as a parallel port, game port or a universal serial bus (USB). Further, information may be printed using printer 40. The printer, and other parallel input/output devices are connected to the processing unit 29 through a parallel port interface 39. A monitor 24 or other type of display device is also connected to the system bus 30 via an interface, such as a video input/output 23. The monitor may display the shared media information and representations, as determined by the application program. In addition to the monitor, personal computers typically include other peripheral output devices (not shown), such as speakers and printers.

Another electronic system may be a remote computer 49 which may operate in a networked environment with personal computer 20, as shown in FIG. 3. The remote computer 49 may be another personal computer or a network PC, and typically includes many or all of the elements described above relative to the personal computer 20. The logical connections depicted in FIG. 3 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 42 or other means for establishing communications over the wide area network 52, such as the Internet. The modem 42, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 5:
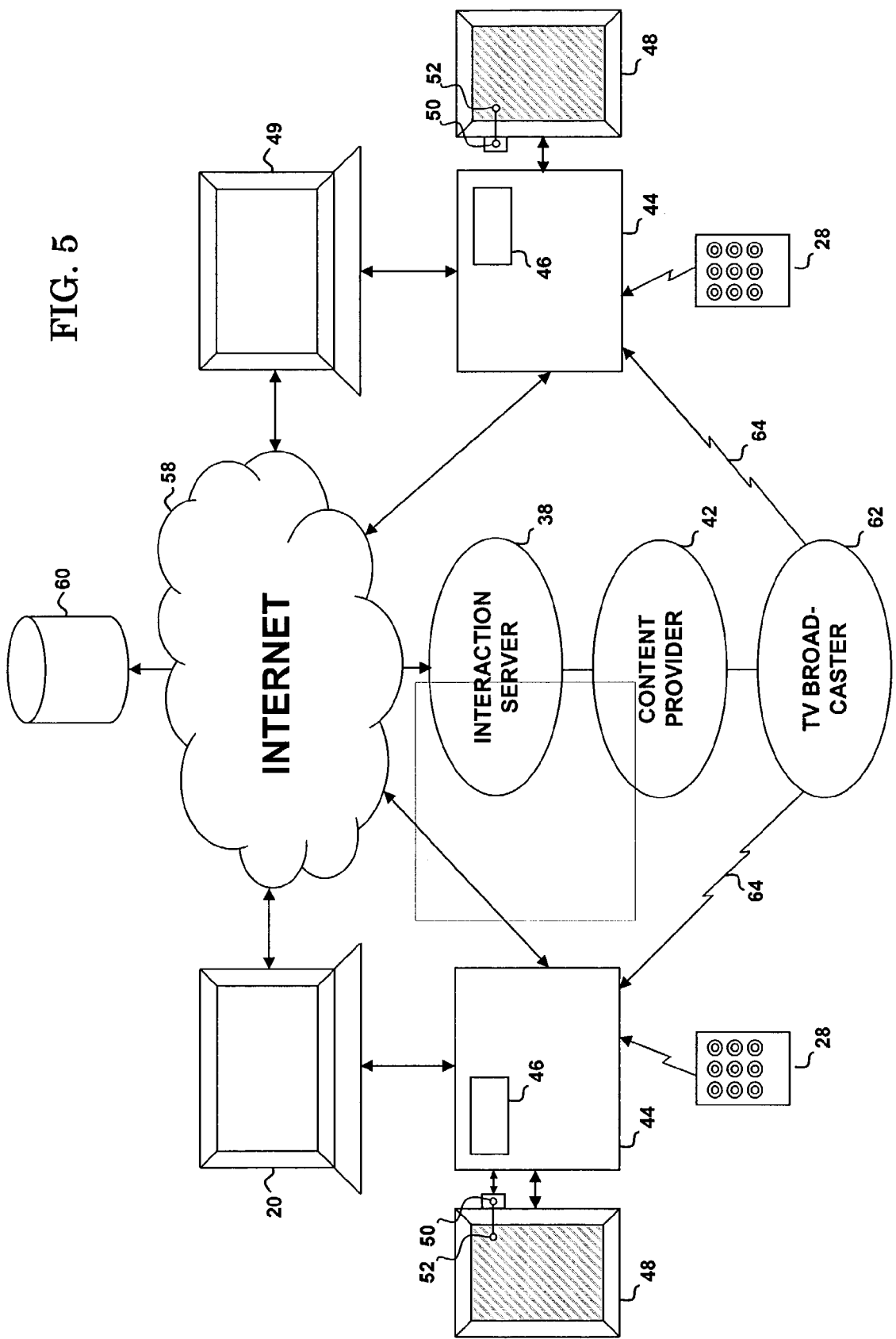
FIG. 5 is an expanded schematic of the embodiment disclosed in FIG. 3 of a system for sharing information among electronic devices.

Still another electronic system may be a set-top box 44 in combination with a monitor 43. The set-top box may also be known as a receiver, converter, decoder, smart encoder, digital TV converter, digital decoder, DTV tuner, descrambler, addressable converter, demodulator, Interactive TV enabled Set-top Box, and Internet-enabled set-top box. As shown in FIGS. 3 and 5, the set-top box is a device separate from the monitor or the television. The function of the set-top box may be built into the monitor 43 or television, which is known as "built-in" functionality.

Set-top boxes may act as a gateway between the television or personal computer (PC) or PC-television and the telephone, satellite or cable feed (i.e., the incoming signal). In terms of interactive television, the set-top box may receive encoded and/or compressed digital signals from the signal source, such as satellite, TV station, cable network, etc., and may decode (and/or decompresses) those signals, converting them into analog signals displayable on the television. The set-top box may also accept commands from the user (often by use of a remote control or keyboard, as discussed below) and may transmit these commands back to the network, often through a back channel (which may be a separate phone line).

As discussed below, the user may enter commands, such as explicit or implicit user input, which may be accepted by the set-top box.

Interactive television set-top boxes may have many functions such as a television receiver, modem, game console, Web browser, method of sending e-mail, Electronic Program Guide (EPG), CD ROM, DVD player, video-conferencing, cable telephony, etc. Further, set-top boxes may be able to communicate in real time with other electronic devices, such as camcorders, DVDs, CD players and music keyboards.

The set-top box may be a computer, with similar components as personal computer 20, that processes digital information. The set-top box may include a processor, a memory, and a receiver for receiving a video presentation, a memory for storing all or part of the video presentation, and a processor. For example, such a system may include a set-top box having an Intel Pentium III processor with 256 MB RAM memory, a graphics card having a nVidia geForce3 chip, a DVD optical drive, a television (or a SVGA computer monitor) and a keyboard in communication with the set-top box. The incoming television broadcast program may be digitized and stored as a MPEG4 format file on a 40 GB hard drive memory storage. The supplemental video content may be an executable instruction set written in Visual C++ and using Microsoft DirectX SDK. The system is thus capable of transmitting to the monitor for display the television broadcast program, the presented supplemental video image content, or a combination of the supplemental video on top of and/or synchronized with the television broadcast program.

Such a set-top box typically has on-screen user interfaces that can be seen on the television screen or monitor and interacted with through the use of an hand-held interactive keypad, such as a remote control. Set-top boxes may also have facilities for upgrading software such as browsers and Electronic Program Guides and may have hard-drives and smart card slots for insertion of a smart card for purchases and identifying the user to the cable, satellite TV provider.

To provide interactive services, the set-top box, from the standpoint of its hardware, may include four components: a network interface 57, decoder hardware 59, a buffer 61, and synchronization hardware 63. The network interface 57 allows the user to receive data from the server and send data back to the server in a manner that can be understood by the server.

The decoder 59 is a device or program that changes encoded data back into its original format (e.g., uncompresses the data). Video presentations (such as movies) are usually encoded (e.g., compressed) before they are sent over the network thus requiring decoding. Decoding is often used in reference to MPEG-2 video and sound data, which should be decoded before viewing. Most DVD players, for example, include a decoder card whose sole function is to decode MPEG data. A digital set-top box and its television built-in counterpart, usually include three decoders: a video decoder (decoding the video packets into images that can be viewed), audio decoder (decompressing the audio bit-stream), and data decoder (assisting in selecting between the hundreds of channels and interactive television services). This functionality may be included in a modem and may be known as demodulation.

With regard to the buffer 61, due to delay jitters in the network, the arrival time of a video stream may not be determined precisely. In order to guarantee continuous consistent playback for the viewer (end-user/subscriber), the stream is often received one or even a few seconds before it is actually seen by the end-user. If there are fluctuations (even those measured in milliseconds) in the transport time of the video stream to that receiver, the viewer will not be aware of the difference as the buffer 61 has additional time.

With regard to synchronization hardware 63, the multimedia information comprises both video and audio streams. The two streams should be synchronized with each other before being viewed. In addition, other streams may be added which may include aspects of enhanced or interactive television.

The application programs 65 for the set-top box may include the underlying system and standards that comprise the set-top box, such as the operating system and programs to execute features of the set-top box. One such feature is a "voice-enabled" set-top box, which allows entry of commands spoken by the subscriber via voice recognition software in the set-top box.

As discussed above, the set-top box may include a back channel. The back channel provides the physical way in which the end-user is able to send information/requests/demands back to the content provider. This may be part of the functionality for interactive television. The back channel may be a 2-way communications link between the TV viewer (end-user) and the Interactive Television content provider; (as opposed to the Front Channel, which is a 1-way communication link from the content provider, such a television network, to the TV viewer). The back channel typically is of much lower bandwidth than the Front Channel. The back channel may include a modem and attached telephone line. Alternatively, the back channel may comprise a cable modem, DSL, or satellite connection.

Figure 4:
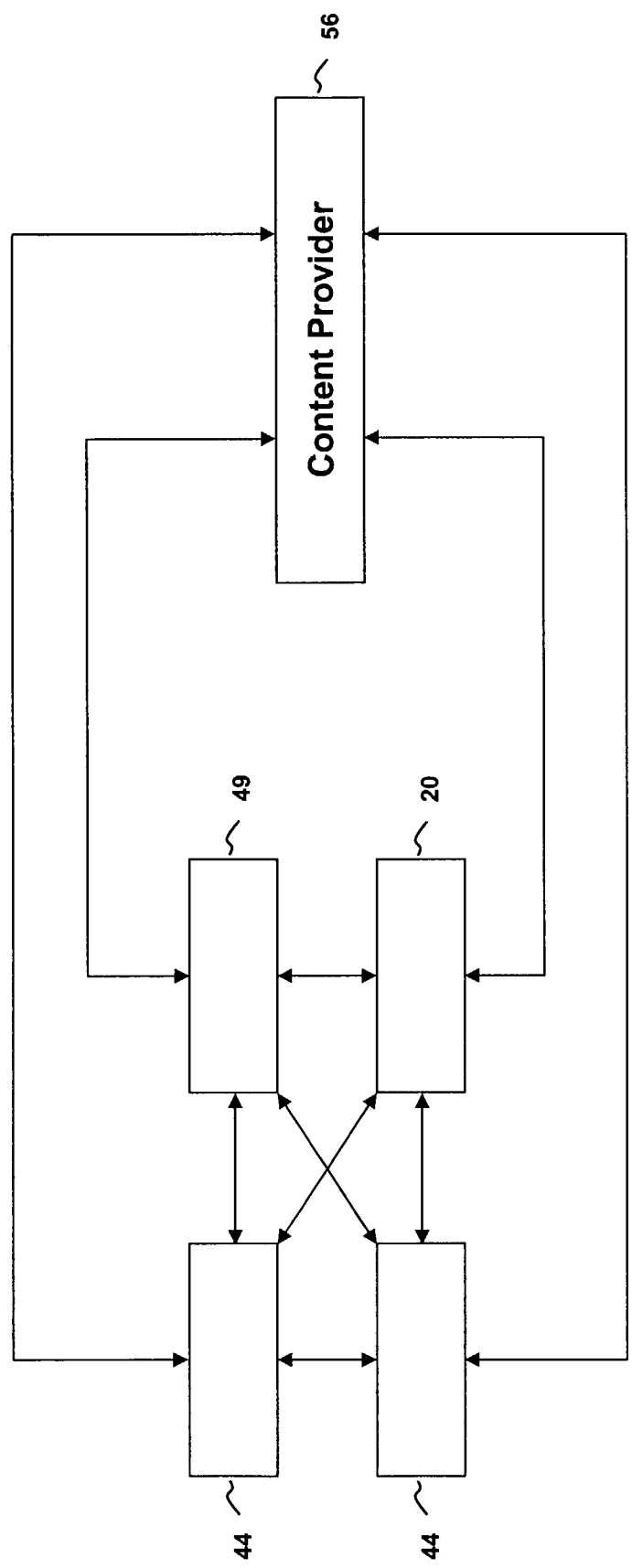
FIG. 4 is a schematic of another embodiment of a system for sharing information among electronic devices.

Referring to FIG. 4, there is shown an alternate topology. The content provider 56 sends shared information, such as media, and related shared information, such as media data, to all participants. As discussed above, the media data is information which is related to the shared information, such as mark-up data or extended data for the shared information. The media data may further be synchronized to the media. A participant's electronic device makes decisions locally based on local preferences such as presence and expression information and media data and then sends instructions to other participants' electronic devices. The interactions may be independent of the content provider.

The socialization of electronic devices may be enhanced by examining the interdependence of the aspects shown in FIGS. 1 and 2. In one embodiment of the invention, participant information is presented in conjunction with the shared multimedia information. In one aspect, the shared multimedia information is presented in an identical manner (or a substantially identical manner) on the first electronic system and the second electronic system. To enhance the shared multimedia experience, information about at least one of the participants or both participants is presented along with the shared multimedia. The shared participant experience is tailored for a specific person, using the characteristics of the specific person, such as the specific person's traits or participant's ideas. In this manner, the electronic devices personalize the shared information experience rather than merely regurgitate the shared information.

In one aspect of the first embodiment, along with the shared multimedia information, a representation is presented. The representation, through choice of the representation and the actions of the representation, encourage social interaction when sharing multimedia information. The choice of the representation allows for a wide range of creative expression. The representation may comprise an avatar, as discussed below, and may include many fanciful traits. Similarly, the actions of the representation may encourage social interaction. Ordinary social interaction includes many simple and universal actions, such as a smile, a wave, laughter, etc. These universal actions, while simple in nature, convey a considerable amount of information and enable people to connect socially. The representation may use these universal actions, in conjunction with or based on the shared information, to enable better social interaction.

This use of a representation is in contrast to providing a video conference in combination with shared multimedia information. Video conferencing typically involves communication between two parties using video software and hardware to see and hear each other. Video conferencing, however, has severe limitations. First, video conferencing merely regurgitates the image and expression of the participants to the shared multimedia presentation. For example, the actual image of one of the participants, rather than a representation, is presented. In this manner, video conferencing limits the vocabulary of presence, expressions, and objects. Presence in video conferencing is defined only to be the user's visual image, which can be extremely limiting. By contrast, a participant using a representation may create any fanciful character, from a representation of a famous actor to Godzilla. Similarly, expressions in a video conference are limited to what the user can do, instead of the myriad of fanciful actions a representation can be created to perform, such as pick up 10,000 pound objects or jump to the ceiling. Finally, objects in video conferencing are limited to what can clearly come across the video conferencing system. Information objects, such as a picture, video file, or chart, cannot be easily transmitted because they must be transmitted through the video conferencing system. Further, there are many times when a visual representation is desired, but not a literal visual representation. For instance, privacy issues may warrant an abstract representation, such as privacy issues with children. Regardless, when sharing media, most of the time the video image would merely show a participant staring at the screen. Such an image is less interesting for the viewer and also can be distracting.

Second, the video conferencing image is not related to objects shared between participants. In this manner, it is difficult to connect a video conference image to the share multimedia presentation. For instance, a video conferencing image of a friend pointing at his or her own screen effectively shows him or her pointing at something that has nothing to do with the screen. In effect, the pointing gesture is meaningless or confusing. Further, video conferencing fails to use the device/task/domain context to determine the forms of presence, expression, and objects that make sense.

Third, video conferencing provides needless information which burdens resources, such as screen space and bandwidth. Instead, a representation allows for amplification through simplification. As discussed above, certain actions and emotions can be more effectively and clearly conveyed through simpler representations than a literal image of a face. When looking at a face, there are many cues that may distract the viewer from the primary cue. A smiley face, by contrast, simplifies a face to a single, simple, emotion—and thus that emotion becomes amplified and more easily differentiated and understood. Also, from a pragmatic standpoint, the screen real estate is fairly precious. One can pack more emotional punch into a set of smaller "amplified" avatars than one can with several very small video images. Further, one's face is a slave to one's every mental command. Using a representation decouples presence and expressions from a person's direct mental state and giving users the ability to filter which of their thoughts actually are reflected as a part of their presence and expression. Finally, video conferencing does not enable much participation from the viewer in interpreting the cues. With video conferencing, what you see is what you get. In contrast, expressing emotions, such as happiness through a picture of a fun shared vacation in Paris, requires the participation of the viewer in interpreting the visual image and attaching the proper shared memory to it to evoke the proper "happiness" emotion. Also, the "presence" is often secondary to the media itself. In that sense, using low-key symbols with amplified expressions enables greater expression without unduly detracting from the shared multimedia information.

The representation associated with a first participant is presented on a second participant's electronic device. Similarly, a representation associated with the second participant may be presented on the first participant's electronic device. As discussed in more detail below, the representation may take a variety of forms. One form comprises a visual representation, such as a literal visual representation. An example of a literal visual representation is an avatar, which is a graphical icon that may represent a real person. The avatar conveys spatial information in the form of an image that is presented or displayed on the monitor. The avatar may also be entirely animated or may be based, in part, on an actual representation of a person (such as an image of a face). Another example of a visual representation might be more abstract, such as a simple icon that is red when a person is sad and green when they are happy. Another form of representation comprises an aural representation, such as spatially defined aural representation. In certain multimedia systems, such as surround-sound multimedia systems, audio outputs may be given a specific spatial determination. The specific spatial determination may comprise a locus of where the representation is presented and may be static (i.e., the sound seems to emanate from only one region of the room) or dynamic (i.e., the sound seems to move to different parts of the room). Still another form of representation is an audio-visual representation. The representation may have visual characteristics, such as an avatar, and audio characteristics, such as audio, which is associated with the representation. Thus, the representation may convey information in addition to and/or in conjunction with the shared information.

The representation may be separate or distinct from, or not integral with, the shared multimedia information. For example, the multimedia information may comprise one stream of information or signal(s) and the representation may comprise another stream of information or signal(s). The multimedia information and the representation may be presented on the same electronic device (such as displayed on the same electronic device); however, the content of the multimedia information is not modified or altered based on the representation (i.e., the representation integrated with the multimedia information). By contrast, the representation may be modified based on the multimedia information, as discussed subsequently. Further, in one aspect, the multimedia information is unalterable during the communication session (such as a television broadcast) while the representation is alterable during the communication session. In another aspect, the multimedia information may be altered during the communication session (such as in the teaching example described below); however, the alteration of the multimedia information is not based on the presenting of the representation.

The representation may be displayed in conjunction with the multimedia information, either by overlaying the representation on the multimedia information or by displaying the representation on a part of the screen separate from the multimedia information. For example, when the shared multimedia information is a shared video presentation (such as a shared television broadcast or a shared DVD presentation), the shared video presentation is not altered by the representation. Rather, the shared video presentation may be shown in conjunction with a representation.

Further, the representation may be displayed at any point during of a communication session, from before the first and second participant share multimedia information and during sharing multimedia information. For example, before the first participant and second participant share multimedia information, a representation of the first participant may be displayed on the electronic device of the second participant immediately after the second participant turns on his or her electronic device. The representation of the first participant may indicate a current activity of the first participant. The activity may indicate that the first participant is using his or her electronic device, such as watching a particular television program or a football game, or may indicate that the first participant is engaged in another activity, such as reading or sleeping. In this manner, the second participant is aware of the activity of the first participant. After the first and second participant begin to share multimedia information, the representations of the first and second participant may be presented based on the shared multimedia information. Thus, initially a participant may see other participant's who are either online or engaged in a certain activity by seeing one type of representation. When sharing multimedia information, another representation may be presented.

The choice of the representation may be based, at least in part, on the multimedia information shared including: (1) based on the content of shared multimedia information; (2) based on the control of the shared multimedia information; and/or (3) based on reaction to the shared multimedia information.

First, the choice or modification of the representation may be based on the content of the shared multimedia information. Content may include various aspects of the shared information. One aspect of the content may be a specific word or phrase present in the shared multimedia information, such as a word or phrase in a shared text message, shared audio message or shared video message. The word or phrase may be reviewed, for example, using word spotting of closed captioning. For example, if the dialogue includes "Character X will arrive soon" and a participant to the shared multimedia presentation hates Character X (as disclosed in the participant's preferences), the avatar may be depicted as being angry. As another example, if the shared multimedia information is from a third party, such as a television broadcaster, the closed captioning may be reviewed to determine whether certain word(s) are present. Another aspect of the content is an event in the shared multimedia information. The event may, for example, be a specific event. One such event is Character X is in the scene. Extended data may indicate that Character X is in the scene. As discussed above, if the preferences of a participant indicate a dislike for Character X, the avatar may be depicted as angry. Another such event is a team scoring in a sporting event. As discussed above, one, some, or all of the participants to a shared information session may have presence and/or expression information. This presence and/or expression information may describe certain aspects of the participant (e.g., identity, awareness, and preferences) such as indicating that a participant is a fan of a specific team. The representation may be modified based on the performance of the specific team, so that when the specific team scores, the representation may "cheer," reflecting the team scoring. The event may be determined from the shared multimedia information in several ways. One way is to include a separate data stream along with the shared multimedia information to indicate an event. For example, the data feed may indicate "goal scored at XX:XX time" or "people are laughing now." Based on this data feed, the presence and/or expression information may be examined. If the event indicated in the data feed correlates to specific presence and/or expression information, the representation may be modified. Another way, as described above, is to review certain aspects of the shared multimedia information, such as text, sound, portions or all of the video, to determine if an event has occurred. The event may also be based on a general event, such as a certain noise level or a certain type of noise. In the example of a sporting event, when the noise is above or below a certain level, the representation may be modified. In times of great noise, the representation may reflect a lot of cheering. Similarly, in times of minimal noise, the representation may reflect hushed silence. In an example of a shared video program, the audio may be checked for a certain type of noise, such as laughing. If the specific type of noise is registered, the representation may reflect that.

Second, the choice or modification of the representation may be based on the control of the shared information. When sharing audio, video, and/or still pictures, one, some, or all of the participants may have control of the shared information. The control may include, for example, (1) changing the channel; (2) stopping, pausing, rewinding, playing, fast-forwarding a video, controlling volume of the video, and zooming to at least a portion of the video; and (3) skipping to the next image, etc. The representation associated with the person controlling the shared information may reflect the control exhibited on the shared information. For example, a participant who fast forwards a shared video may have the avatar associated with the participant indicate the fast-forwarding of the video. This indication of the avatar fast-forwarding may be shown prior to and/or simultaneous with the actual fast-forwarding of the shared video. In this manner, other participants to the shared information are given an indication of what is being performed and who is controlling the shared information, thus avoiding contextless control changes in the shared information.

Third, the choice or modification of the representation may be based on a reaction elicited by one of the participants to the shared information, which may indicate expression information. The reaction to the shared information may either be by implicit participant input, as discussed with respect to block 13 of FIG. 2, or by explicit participant input, as discussed with respect to block 14 of FIG. 2. With implicit participant input, the reaction of the viewer to the shared multimedia information may be registered using sensors. One sensor may be an audio sensor, which records the sounds of one of the participants. The shared information, such as a video program or video game, elicits an audio reaction from one of the participants. The audio reaction may be input using the audio sensor and transmitted to at least one, some, or all of the other participants. The representation may reflect the transmission of the audio information. In one embodiment, the representation may be an avatar with human-like characteristics, such as a mouth. When the audio information is presented to the other participants, the mouth of the avatar may move in order to mimic or mouth the words spoken. Alternatively, audio information may be in the form of laughter by one of the participants. This laughter may be sensed and translated into an avatar that mimics laughter. In this manner, the avatar and audio information work in conjunction with the shared video information. Another sensor may be a motion sensor, which senses movement of one of the participants to the shared information. As one example, the motion sensor may sense children dancing to a shared video program. The sensed dancing may be translated into a representation which simulates a dancing motion. The sensed dancing may be translated into an audio representation, in a surround-sound system, that "moves" about the room in a similar manner. As another example, the motion sensor may sense physical reactions to a television program, such as a sports game. Still another sensor may be a facial expression sensor, which senses the facial expression of one of the participants. The sensed facial expression may translate into a representation that mimics the expression. For example, if the facial expression sensor sensing a smile, the representation may include a "happy face." In addition to implicit reaction information, one of the participants may explicitly or manually input the reaction to the shared information. For example, a participant may input via a keyboard or a pen-based computer reaction information. The reaction information may include an emotion, such as anger, happiness, etc. Based on the reaction information, the representation may be modified to reflect the reaction information. For example, the representation may indicate happiness, such as by visually producing a "happy face" in response to an input of happiness as reaction information.

Further, the choice of actions of the representation may be based on the shared multimedia and based on the representation itself. For example, if the representation is an avatar, such as a dog, the choice of actions of the representation may be based on an event in the shared multimedia and based on actions that the avatar would perform. In the present example, if the event in the shared multimedia indicates that the participant represented by the dog avatar is booing, the choice of actions of the representation to indicate that the dog is howling.

Referring to FIG. 5, there is shown a schematic diagram of a system which may share multimedia information. One electronic device for the participant is a set-top box 44 similar to the one described in FIG. 3. Preferably, the set-top box 44 has a video output connection to a television set or video display monitor 43. The video output could be either analog or digital, depending on the input capabilities of the monitor 43. The display monitor 43 may be adapted to include a sensor 39 to sense the activities of the participant or to input data from the participant. The sensor 39 may enable implicit or explicit participant input, as discussed with respect to FIG. 2. In one example, the sensor 39 may enable explicit participant input via a touch sensitive input device overlaying the display screen 41. In another example, the sensor 39 may be a motion sensor, sensing the movements of a participant. The set-top box 44 may be operated through use of a remote controller 61. For example, the shared video information may be controlled using the remote controller 61, such as by stopping, rewinding, playing, fast-forwarding, etc. In addition, the set-top box 44 may be connected, either directly or via the internet 58, with a personal computer 20, 49.

Although referred to herein as a "set-top box," the electronic device which interacts with the monitor may be located in a variety of places in a viewer's home, or incorporated with other hardware such as, but not limited to, the television video display monitor, a separate personal computer 20, home theater audio/visual equipment, etc. Also, the set-top box controller may be located off the premises such as at a local cable provider's distribution center, which would require broadband connectivity with other components of the system.

The shared multimedia information may be obtained from a variety of sources. For example, the set-top boxes 44 may receive the shared multimedia information from a third party, such as by television broadcast programming signals 62, either through standard wireless transmissions 64, broadband cable connections, broadband satellite transmissions, or other means for connectivity. The set-top box 44 may also be connected through a broadband connection, such as through the Internet 58 or other external communications networks, to data sources 60. Alternatively, one set-top box may receive information sent from another set-top box. For example, the information shared amongst participants may come from CD-ROM's or DVD's placed in the optical drive 45 of the set-top box 44. The shared information may be transmitted, via PCs and the Internet, to each of the set-top boxes.

Based on the shared multimedia information, a representation may be presented. The representation may be determined based on participant preferences, such as presence and expression information. The participant preferences may be stored in a variety of locations such as on the set-top box 44, on the personal computer 20, at the content provider 56, or on other storage devices 60 that the set-top box 44 is in communication with either in the viewer's home or outside. Different devices in FIG. 5 may determine the representation based on the storage location of the participant preferences. For example, content provider 56 may make decisions based on participant preferences stored at the content provider 56 or at storage device 60. The content provider may then pass final instructions to other participants' set-top boxes 44. These instructions are received by the set-top boxes and processed for enhanced custom content television viewing on an individual's home television 43. Alternatively, the personal computer or set-top box may make decisions based on participant preferences and send instructions to other set-top boxes.

The set-top box, via connection with the personal computer 20, may access data stored on the personal computer 20 via a direct connection or available through the personal computer's connection with the Internet 58 or other external communications network. Likewise, the personal computer 20 may be used as an alternative interface for programming or setting up the set-top box. For example, the personal computer 20 may send images of representations, such as an avatar, to the set-top box 44. The personal computer 20 may also store a music catalog owned by the participant from which the set-top box may retrieve the viewer's favorite music for customized audio accompaniments or backgrounds to send to other participants as described in further detail below. Further, the personal computer 20 may be used to input explicit participant input, as described previously. For example, explicit participant input may be entered via a keyboard on the personal computer 20.

Preferably, the set-top box 44 has the sufficient image processing, graphics capability and memory storage to seamlessly integrate the television broadcast and additional participant information, such as a representation, in real time. As discussed previously, the set-top box may accept analog or digital television broadcasts, strip off extended codes in the broadcast that may instruct the set-top box as to the content of the broadcast.

The set-top box 44 preferably can store both the television broadcast signal and the supplemental multimedia and data content (such as a representation), and then synchronize and assemble the multiple content for display in real-time via the synchronizing hardware 63, or at a later time depending on the individuals viewers preferences. In one embodiment, the set-top box may be considered to have the capabilities of personal digital television recorders, internet-capable video game players and computer video workstations. The digitized television signals and computer-generated supplemental video images from the set-top box being displayed preferably appear in the same quality as television broadcast signals today.

A system having the aforementioned capabilities may be suitable for providing a variety of enhanced television viewing modalities. The present invention includes several embodiments of methods that are directed at enhancing the sharing of information. With a set-top box that is capable of merging the shared video information with a representation in real time, a viewer can experience the quality of normal television broadcast advertising in a creative and engaging experience.

Figure 6:
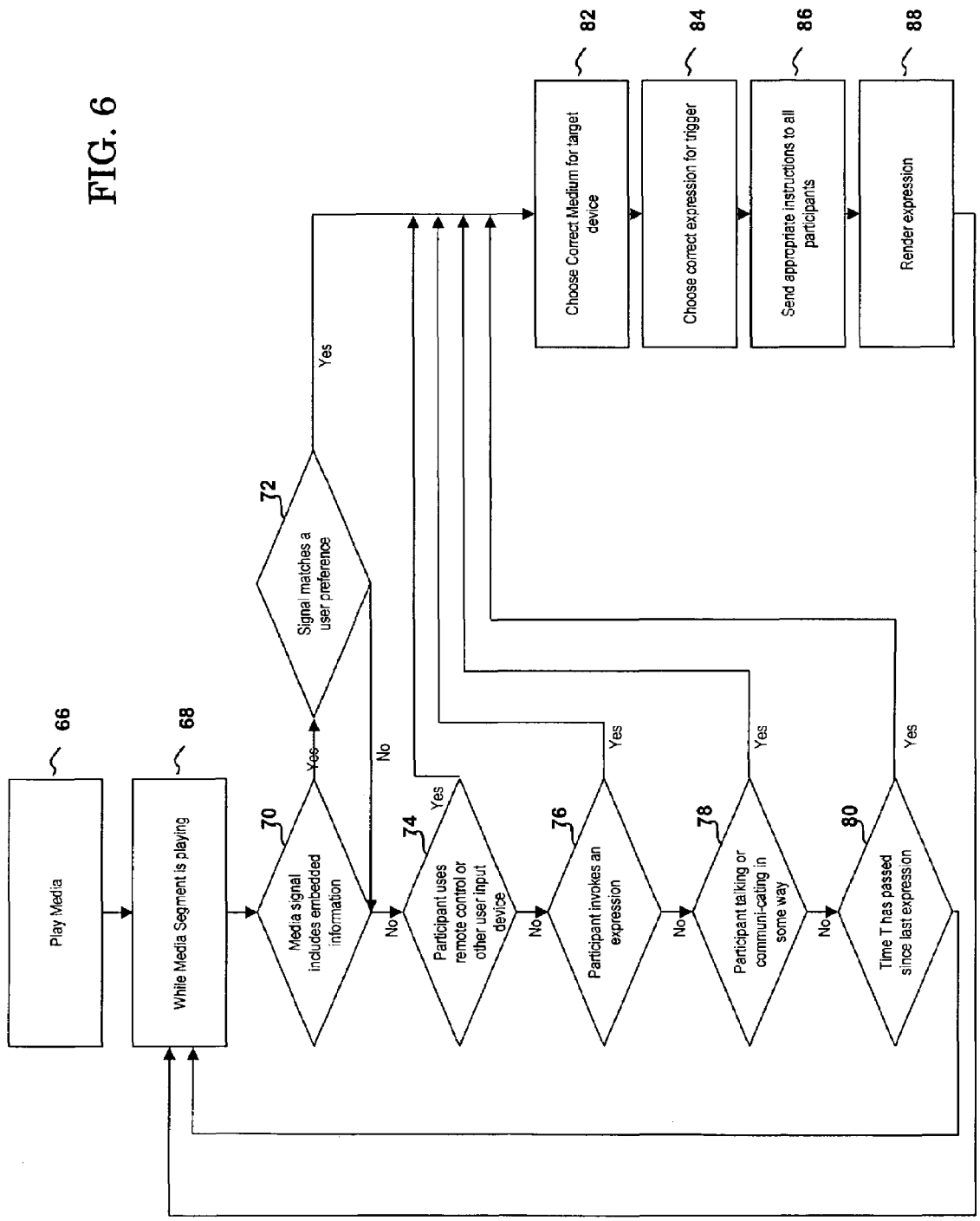
FIG. 6 is a flow chart for an exemplary embodiment of the invention in which participant information is presented in conjunction with the shared multimedia information.

Referring to FIG. 6, there is shown a flow chart for an exemplary embodiment of the invention in which participant information is presented in conjunction with the shared multimedia information. At block 66, the multimedia is played at the electronic devices. The multimedia includes information for at least two senses, such as audio-visual information. While the multimedia segment is playing (block 68), the multimedia signal is checked to determine whether it includes extended information. Extended information may include aspects of the underlying multimedia including words (such as closed captioning) or events (such as a specific team scoring, a specific player is participating, a media climax occurring (such as a verdict being read on a television show)). Extended information may be bundled with the multimedia signal or may be a signal which is separate from the multimedia signal (such as sending the multimedia signal through a broadcast and sending the extended information through an internet connection). Based on the extended information, the participant preferences are checked to determine whether any action should be taken, as shown at block 72. For example, if a specific team is scoring, as indicated by the extended information, the participant preferences are reviewed to determine whether a specific participant is a fan of the scoring team. Participant preference may be included in presence information, which indicates facts about a participant. If a match is found, the representation to reflect the match is determined, as discussed with respect to blocks 82-88. In the example of the team scoring, if the participant is a fan of the scoring team, the representation may cheer, such as by presenting the avatar to jump up and down.

Implicit participant input may also be entered. As discussed above, implicit participant input may include any indirect input by the participant, such as automatic reaction information of the participant from sensors which determine a participant's reaction to the shared information and input from controllers/devices the participant may be using, such as a remote controller. For example, the participant may use a remote control or other user input device, as shown at block 74. If the participant uses a remote control, the representation should reflect that action. Further, if the user is providing input by talking or communicating, as shown at block 78, the representation should reflect the audio input. For example, if the representation is an avatar, the avatar may have human features, such as a mouth. The avatar may be presented such that, when the avatar and the participant audio are presented at the other electronic devices, the mouth of the avatar moves, thereby mimicking speaking.

Explicit participant input may further be entered. As shown at block 76, the participant may enter a command, such as via the PC 56 or remote controller 61. For example, the participant may enter a command to cheer. The cheer command may translate into presenting the avatar to jump up and down.

Further, the time may be checked since the last expression, as shown at block 80. In order to enliven the representation, the representation may move if a predetermined time T has passed since the last change in the representation. For example, if the representation is a picture of a cat, the cat may idly groom itself (such as licking its paw) when it has been idle for the predetermined time. In this manner, the cat is given a more animated "presence," even when there are no expressions to enact. Similarly, if the representation has a front and a back, the representation may face the participant, showing its front, while conveying information, such as speaking. After a predetermined time T, the representation may be turned so that its back is facing the participant. Similarly, if the representation has its back to the participant, when the representation conveys information, such as speaking, the representation is turned so that its front faces the participant. In this manner, the representation may be less obtrusive to the participants, only turning and facing the participants when the representation has information to convey. Further, it allows the avatar to provide the impression that remote people are present during a shared multimedia presentation. Moreover, these small random bits of action make the avatar appear much more organic and lifelike than a display that only responds to a rigid set of rules.

As shown at block 82, the correct medium is chosen for the target device. Many electronic devices with different capabilities may be used. The presenting of the representation may depend on the capabilities of the electronic device. For example, a telephone will have mostly an audio output whereas a television may have audio and visual output. The correct expression is then chosen, as shown at block 84. The triggering event dictates the expression of the representation. For example, a "cheering" triggering event will dictate that the representation should cheer. The appropriate instructions are sent to the other participants, as shown at block 86. After which, the expression is presented at the other participants, as shown at block 88.

Figure 7:
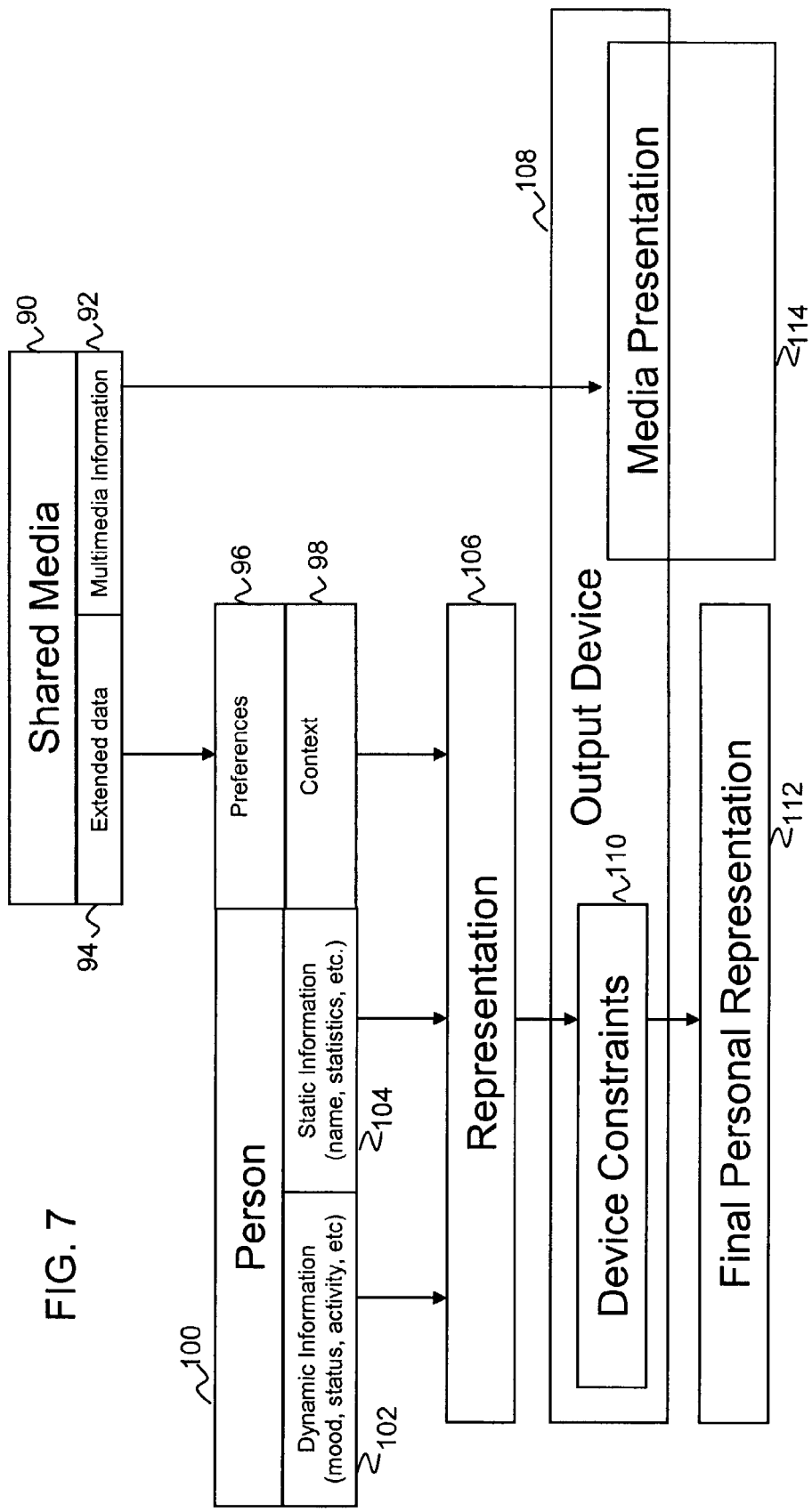
FIG. 7 is a flow diagram for creating a personal representation in combination with a media presentation.

Referring to FIG. 7, there is shown a flow diagram for creating a personal representation in combination with a media presentation. As shown at block 90, the shared media may contain both multimedia information 92 and extended data 94. As discussed above, the multimedia information 92 and the extended data 94 may be bundled together in one signal or comprise separate signals. The extended data may be analyzed with preferences, as shown at block 96. As discussed above, preferences may include attributes about the person, such as favorite characters in a television program, favorite sports teams, etc. Other aspects specific to the person 100 may include presence and/or expression attributes, such as awareness information, as shown at block 102 and identity information, as shown at block 104. Presence and expression attributes are discussed above with respect to FIGS. 1-2. Further, context of the shared multimedia communication session may be factored into generating a representation, as shown at block 98. The context of the communication session may comprise a business setting or an informal setting, such as a nighttime setting.

Given the preferences, presence information, expression information, and context, a representation may be selected for presentation on the output device 108. Device constraints, as shown at block 110, may need to be factored into presenting the representation. For example, if the representation requires graphics which the output device 108 cannot perform, the representation is modified, and then output as a final personal representation, as shown at block 112. If the output device can accommodate presenting the representation, the representation is not modified. The representation may be presented in conjunction with (either before, during or after) the media presentation 114.

The shared information may be enhanced by presenting a representation in conjunction with the shared information. The shared information may be textual, aural, or visual. Further, the representation, as described above, may be textual, visual, audio, or audio-visual. Moreover, the choice of the representation may be based on information shared including: (1) based on the content of shared information; or (2) based on the control of the shared multimedia information.

As discussed previously, the content of the shared information, such as a specific word or phrase, a specific audio message, a specific image, may trigger a representation to be presented. Likewise, the control of the shared information, such as control of a shared audio presentation, shared image presentation (such as a slide show), or shared text presentation may trigger a representation to be presented. For example, in a shared slide presentation, a representation, such as an avatar, may indicate when the slides are changed. The slide presentation may include slide previously prepared. Alternatively, the slide presentation may comprise slides that are created during the communication session.

The presently disclosed system may be used in a variety of environments, such as home and business environments. For example, two users may watch a shared video presentation (such as a broadcast television presentation or a DVD presentation) at their respective homes while still interacting on a social level. As another example, students in remote locations may interact with a teacher. The teacher may provide multimedia information in the form of slides in combination with audio of the teacher or a video of the teacher (which may include still or moving pictures of the teacher writing on a chalkboard and audio of the teacher). The students in remote locations may receive the multimedia information and also a representation of the teacher and/or another student. For example, an avatar of the teacher may be shown on the students' monitors. Alternatively, audio representations for the teacher and/or the students may be presented spatially. The teacher's audio representation may be presented in the front of each student. Other student's audio information may be presented spatially in a predetermined manner. Thus, a virtual classroom may be presented where students are assigned a predetermined audio spatial orientation, and these audio signals may be presented to other students. Moreover, movement of the teacher and/or students may be simulated by movement of the audio representation. For example, if the teacher is pacing at the front of the classroom, the audio representation presented at the students' electronic systems may simulate that the audio output is moving back and forth at the front of the room.

While this invention has been shown and described in connection with the preferred embodiments, it is apparent that certain changes and modifications in addition to those mentioned above may be made from the basic features of this invention. In addition, there are many different types of computer software and hardware that may be utilized in practicing the invention, and the invention is not limited to the examples described above. The invention was described with reference to acts and symbolic representations of operations that are performed by one or more electronic devices. As such, it will be understood that such acts and operations, include the manipulation by the processing unit of the electronic device of electrical signals representing data in a structured form. This manipulation transforms the data or maintains it at locations in the memory system of the electronic device, which reconfigures or otherwise alters the operation of the electronic device in a manner well understood by those skilled in the art. The data structures where data is maintained are physical locations of the memory that have particular properties defined by the format of the data. While the invention is described in the foregoing context, it is not meant to be limiting, as those of skill in the art will appreciate that the acts and operations described may also be implemented in hardware. Accordingly, it is the intention of the Applicants to protect all variations and modification within the valid scope of the present invention. It is intended that the invention be defined by the following claims, including all equivalents.

The invention claimed is:

1. A method for enhancing shared multimedia information in a communication session between a first participant on a first electronic system and a second participant on a second electronic system comprising:
    presenting multimedia information in the communication session identically on the first electronic system and on the second electronic system;
    automatically determining an event in the multimedia information presented in the communication session;
    determining an avatar of the first participant based on the event in the multimedia information presented in the communication session, the avatar being separate from the multimedia information; and
    presenting the avatar on the second electronic system in the communication session,
    wherein determining the avatar comprises modifying the avatar based on the multimedia information presented in the communication session.

2. The method of claim 1, wherein the multimedia information is created prior to the communication session, and
    wherein actions of the avatar are created during the communication session.

3. The method of claim 1, wherein the multimedia information is a television broadcast.

4. The method of claim 1, wherein presenting multimedia information in the communication session comprises presenting multimedia information identically on the first electronic system and on the second electronic system.

5. The method of claim 1, wherein presenting multimedia information on the second electronic system comprises displaying the multimedia information on a first portion of a display of the second electronic system, and
    wherein presenting the avatar on the second electronic system comprises displaying the avatar on a second portion of the display of the second electronic system, the first portion and the second portion being mutually exclusive of one another.

6. The method of claim 1, wherein presenting multimedia information on the second electronic system comprises displaying the multimedia information on a display of the second electronic system, and
    wherein presenting the avatar on the second electronic system comprises displaying the avatar on the display of the second electronic system, the representation overlaying at least a portion of the multimedia information on the display.

7. The method of claim 1, wherein the avatar is based, in part, on an actual representation of the first participant.

8. The method of claim 1, wherein determining the avatar comprises determining an avatar to convey mood of the first participant.

9. The method of claim 1, wherein determining the avatar comprises determining an avatar to convey expression of the first participant.

10. The method of claim 1, wherein modifying the avatar is based on the multimedia information presented in the communication session and based on a choice of avatar.

11. The method of claim 1, further comprising:
    determining an avatar of the second participant based on the multimedia information presented in the communication session, the avatar of the second participant being separate from the multimedia information; and
    presenting the avatar of the second participant on the first electronic system in the communication session.

12. The method of claim 1, wherein automatically determining an event in the multimedia information presented in the communication session comprises automatically analyzing at least one aspect of the shared multimedia information to determine the event.

13. The method of claim 12, wherein determining the avatar of the first participant comprises:
comparing the event with participant information associated with the first participant; and
determining the avatar based on the comparison.

14. The method of claim 12, wherein the shared multimedia information comprises audio information; and
wherein automatically determining an event in of the multimedia information comprises analyzing at least a portion of the audio information.

15. The method of claim 12, wherein the shared multimedia information comprises video; and
wherein the at least one aspect of the shared multimedia information comprises extended data of the video; and
wherein analyzing at least one aspect of the shared multimedia information to determine the event comprises comparing the extended data with predetermined data.

16. The method of claim 15, wherein the extended data comprise extended text, and
wherein analyzing at least one aspect of the shared multimedia information comprises comparing the extended text with predetermined text.

17. The method of claim 15, wherein the extended data comprise extended event information in the video, and
wherein analyzing at least one aspect of the shared multimedia information comprises comparing extended event information with predetermined events.

18. The method of claim 1, wherein presenting the avatar is performed simultaneously with presenting the shared multimedia information.

19. The method of claim 1, wherein presenting the avatar is performed prior to presenting the shared multimedia information.

20. The method of claim 1, wherein presenting the avatar is performed after presenting the shared multimedia information.

21. A method for enhancing shared multimedia information in a communication session between a first participant on a first electronic system and a second participant on a second electronic system comprising:
presenting multimedia information in the communication session identically on the first electronic system and on the second electronic system;
determining an avatar of the first participant based on control by the first participant of the shared multimedia information presented in the communication session, the avatar being separate from the multimedia information; and
presenting the avatar on the second electronic system in the communication session,
wherein the shared multimedia information comprises a video, and
wherein determining the avatar based on control of the shared multimedia information by the first participant comprises control of the video by the first participant.

22. The method of claim 21, wherein control of the video is selected from the group consisting of rewinding the video, playing the video, stopping the video, fast-forwarding the video, pausing the video, skipping to another portion of the video, controlling volume of the video, and zooming to at least a portion of the video.

23. A method for enhancing shared multimedia information in a communication session between a first participant on a first electronic system and a second participant on a second electronic system comprising:
presenting multimedia information in the communication session identically on the first electronic system and on the second electronic system;
determining an avatar of the first participant based on control by the first participant of the shared multimedia information presented in the communication session, the avatar being separate from the multimedia information; and
presenting the avatar on the second electronic system in the communication session,
wherein the shared multimedia information comprises still images, and
wherein determining the avatar based on control of the shared multimedia information by the first participant comprises control of presentation of the still images.

24. A method for enhancing shared multimedia information in a communication session between a first participant on a first electronic system and a second participant on a second electronic system comprising:
presenting multimedia information in the communication session identically on the first electronic system and on the second electronic system;
determining an avatar of the first participant based on sensed reaction of the first participant to the shared multimedia information presented in the communication session, the avatar being separate from the multimedia information; and
presenting the avatar on the second electronic system in the communication session,
wherein the first participant reaction to the shared multimedia information comprises reaction data input by the first participant.

25. The method of claim 24, wherein the sensory data comprises auditory data from the first participant,
wherein the avatar has a mouth, and
wherein determining the avatar based on the reaction comprises modifying the mouth of the avatar to mimic speaking.

26. The method of claim 24, wherein the sensory data comprises movement data of the first participant, and
wherein determining the avatar based on the reaction comprises determining the avatar based on the movement data of the first participant.

27. The method of claim 26, wherein determining the avatar based on the movement data of the first participant comprises modifying the avatar to mimic the movement data of the first participant.

28. A method for enhancing shared multimedia information in a communication session between a first participant on a first electronic system and a second participant on a second electronic system comprising:
automatically determining movement of the first participant;
presenting multimedia information in the communication session identically on the first electronic system and on the second electronic system;
determining a representation of the first participant, the representation being separate from the multimedia information;
determining spatial information for the representation based on the automatically determined movement of the first participant; and presenting the representation on the second electronic system in the communication session, the representation conveying the spatial information, wherein the representation comprises an audio representation with spatial orientation, and when the first participant moves, the spatial orientation of the representation changes based on the movement of the first participant.

29. The method of claim 28, wherein the representation is an avatar and wherein the spatial information is a location of the avatar on a display.

30. A method for enhancing a communication session between a first participant on a first television receiver and a second participant on a second television receiver comprising:

automatically sensing activity of the first participant;

presenting multimedia information on the second television receiver;

determining a representation of the first participant based on the sensed activity of the first participant, the representation being separate from the multimedia information presented on the second television receiver; and presenting the representation on the second television receiver in the communication session, wherein the first participant reaction to the shared multimedia information comprises reaction data input by the first participant.

31. The method of claim 30, wherein the representation is an avatar.

32. The method of claim 30, wherein automatically sensing activity of the first participant comprises automatically sensing whether the first participant is watching television on the first television receiver.

33. The method of claim 30, further comprising:

sending a message from the second participant to the first participant to engage in a shared multimedia presentation; and presenting multimedia information in the communication session identically on the first television receiver and on the second television receiver.

34. A system for enhancing a multimedia presentation between a first participant and a second participant comprising:

a first electronic system capable of presenting the multimedia presentation, the first electronic system having an input device, the input device for generating input indicative of automatic sensed reaction of the first participant to the multimedia presentation or control of the multimedia presentation by the first participant;

a second electronic system in communication with the first electronic system for receiving data based on the input from the input device, the data indicative of the automatic sensed reaction of the first participant to the multimedia presentation or indicative of the control of the multimedia presentation by the first participant, the second electronic device comprising:

receiver for receiving the multimedia presentation;

memory for storing at least a portion of the data based on the input and avatar information of the first participant;

processor in communication with the memory and the receiver for selecting an avatar to be presented based on the at least a portion of the data indicative of sensed reaction to or control of the multimedia presentation and the avatar information; and display monitor in communication with the processor for presenting the avatar selected by the processor and for presenting the multimedia presentation, the presenting of the multimedia presentation being identical to the multimedia presentation presented on the first electronic system.

35. The system of claim 34, wherein the receiver comprises a broadcast signal receiver, and wherein the multimedia presentation comprises a broadcast television presentation.

36. The system of claim 34, wherein the input device comprises a microphone, wherein the data based on input from the input device comprises audio data, wherein the avatar has a mouth, and wherein the processor modifies the mouth of the avatar to mimic speaking.

37. The system of claim 34, wherein the input device comprises a remote controller, wherein the data based on input from the input device comprises control data for the multimedia presentation, and wherein the processor selects the avatar based on the control data.

38. The system of claim 34, wherein the multimedia presentation comprises still images, and wherein the processor selects the avatar based on the control by the first participant of presentation of the still images.

39. The system of claim 34, wherein the second electronic system comprises a set-top box.

40. A system for enhancing a video presentation between a first participant and a second participant comprising:

a first electronic system capable of presenting the video presentation;

a second electronic system in communication with the first electronic system, the second electronic device comprising:

receiver for receiving the video presentation;

memory for storing at least a portion of the video presentation and avatar information of the first participant;

processor in communication with the memory and the receiver for determining an event in the video presentation and selecting an avatar to be presented based on the determined event in the video presentation and the avatar information; and video display monitor in communication with the processor for presenting the avatar selected by the processor and for presenting the video presentation, the presenting of the video presentation being identical to the video presentation presented on the first electronic system, wherein the processor modifies the avatar based on the multimedia information presented in the communication session.

41. The apparatus of claim 40, wherein the video presentation comprises video data and extended data, wherein the avatar information comprises first participant user preferences, and wherein the processor determines the event based on the extended data and selects the avatar based on comparison of the first participant user preferences with the determined event.

* * * * *

UNITED STATES PATENT AND TRADEMARK OFFICE
CERTIFICATE OF CORRECTION

PATENT NO. : 7,409,639 B2
APPLICATION NO. : 10/464917
DATED : August 5, 2008
INVENTOR(S) : Kelly L. Dempski et al.

It is certified that error appears in the above-identified patent and that said Letters Patent is hereby corrected as shown below:

In column 7, line 32, after "through the use of" delete "an" and substitute --a-- in its place.

In column 8, line 23, after "content provider, such" insert --as--.

In column 11, line 4, before "a communication session" delete "of".

In column 13, line 49, after "directly or via the" delete "internet" and substitute --Internet-- in its place.

In column 14, line 57, before "preferences." delete "individuals viewers" and substitute --individual's viewer-- in its place.

In column 14, line 59, after "television recorders," delete "internet-capable" and substitute --Internet-capable-- in its place.

In column 15, line 24, before "connection)." delete "internet" and substitute --Internet-- in its place.

In column 19, claim 14, line 13, after "determining an event in" delete "of".

Signed and Sealed this

Twenty-fifth Day of May, 2010

David J. Kappos
*Director of the United States Patent and Trademark Office*